UNITED STATES PATENT OFFICE.

G. W. SMITH, OF NORTH WHITEHALL TOWNSHIP, LEHIGH COUNTY, PA.

IMPROVED LINIMENT.

Specification forming part of Letters Patent No. 46,715, dated March 7, 1865.

*To all whom it may concern:*

Be it known that I, G. W. SMITH, of North Whitehall township, in the county of Lehigh and State of Pennsylvania, have invented a new and Improved Liniment; and I do hereby declare that the following is a full, clear, and exact description thereof, which will enable those skilled in the art to fully understand and make use of the same.

This invention is intended as a remedy for such diseases as the swinney in horses or for other similar afflictions, and when applied twice or three times to the afflicted part it gives relief in a very short time.

This invention consists in a compound made of spirits of camphor, spirits of turpentine, alcohol, and fowl-oil, and these ingredients are mixed together in about the following proportions: spirits of camphor, two parts; spirits of turpentine, two parts; alcohol, two parts; fowl-oil, four parts. Spirits of camphor, spirits of turpentine, and alcohol are put into a bottle, and then the fowl-oil is added, and after the several ingredients are well mixed by shaking the liniment is ready for use. It is particularly useful as a remedy for swinney in horses—a disease generally brought on when the horse is sprained either by slipping, falling, or overwork, and it first exhibits its effects in lameness of the shoulder of the horse and a disposition to hold up the foot on the side affected, or to lie down if both sides are affected. The pain soon causes a contraction of the muscles on the outside of the shoulder-blade and a falling away of the flesh, and, if not checked, the skin will contract, and might be said to adhere to the bone. If the disease is not quickly cured, the horse will be stiff for life. The application of my compound to the part diseased takes away the pain by producing a mild counter irritation; and the camphor, turpentine, and alcohol, being held in solution by the fowl-oil, are absorbed by the skin and penetrate to the muscles, and by stimulating the blood-vessels to action they cause the flesh to grow in a short time, while the skin remains soft. By applying my liniment two or three times a day the afflicted part is relieved, and by continuing the use of the liniment for a short time the disease will be made to disappear entirely.

I claim as new and desire to secure by Letters Patent—

A liniment composed of the ingredients herein specified and mixed together substantially in the manner and about in the proportion set forth.

G. W. SMITH.

Witnesses:
GEO. S. CORWIN,
CHAS. CORWIN.